United States Patent [19]
Anderson et al.

[11] 3,971,484
[45] July 27, 1976

[54] TRUCK MOUNTED CARPET HANDLING EQUIPMENT

[75] Inventors: Lloyd E. Anderson; Gilbert L. Alinder, both of Minneapolis, Minn.

[73] Assignee: National Carpet Jobbers, Minneapolis, Minn.

[22] Filed: Apr. 14, 1975

[21] Appl. No.: 567,712

[52] U.S. Cl. ............... 214/85.5; 214/85.1; 214/152; 214/517; 214/DIG. 4
[51] Int. Cl.² ........................................... B60P 1/00
[58] Field of Search.............. 214/75 H, 85.1, 85.5, 214/92, 94, 152, 517

[56] References Cited
UNITED STATES PATENTS
2,514,752  7/1950  Faulkner ........................ 214/85.5
3,750,811  8/1973  Anderson et al. ............. 214/85.5 X

*Primary Examiner*—Robert G. Sheridan
*Attorney, Agent, or Firm*—Schroeder, Siegfried

[57] ABSTRACT

Truck mounted carpet roll loading and unloading apparatus is provided comprising an electrically driven shaft mounted on the front wall of the truck which is remotely controlled to wind and unwind a cable which, for selected steps in the loading and unloading process, is passed through a pulley assembly before being attached to the carpet roll. Operation of the shaft permits step by step loading of the carpet roll utilizing a single cable connected to the carpet at only one point.

5 Claims, 7 Drawing Figures

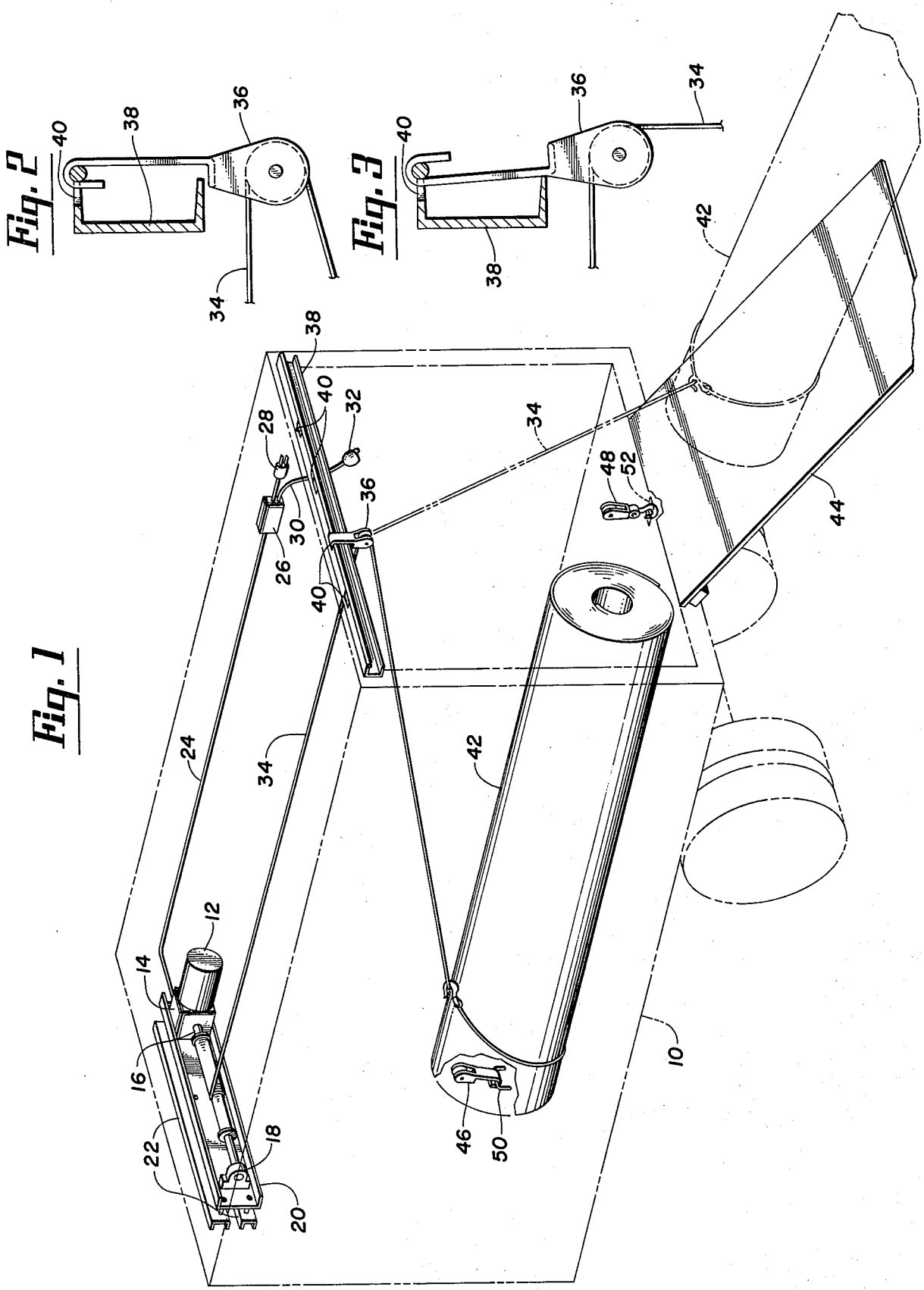

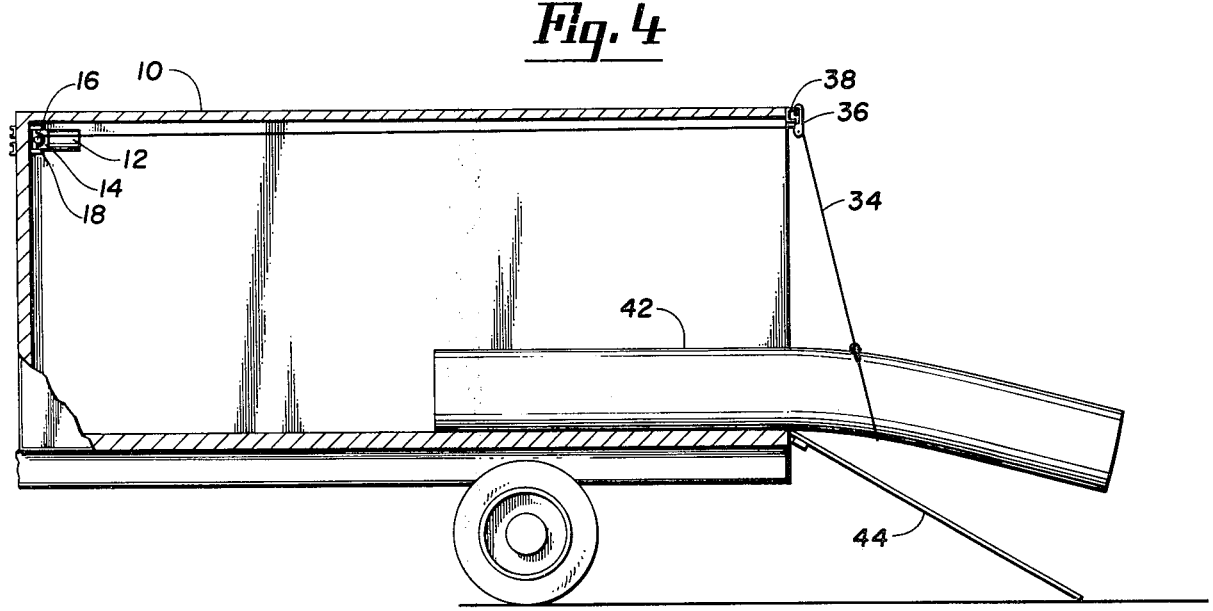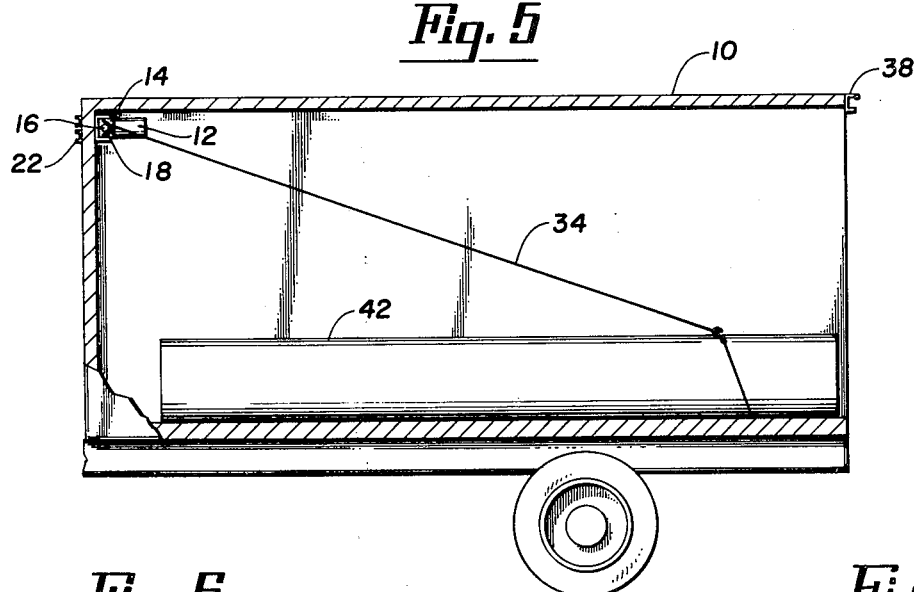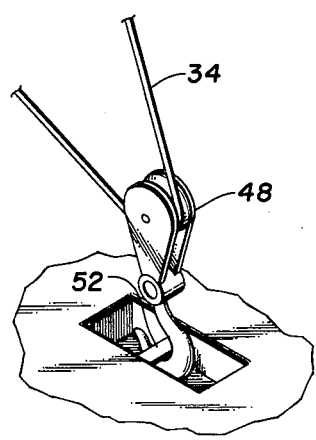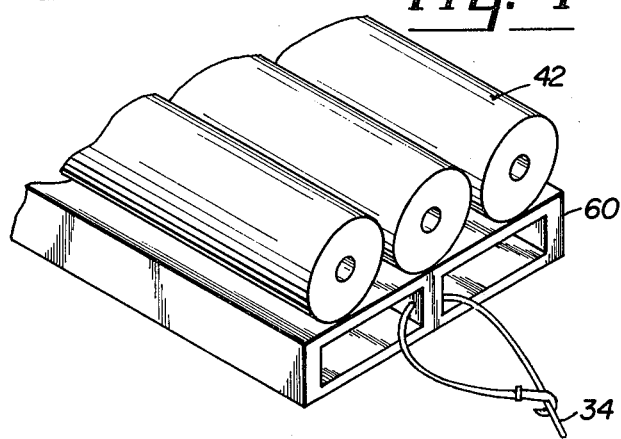

TRUCK MOUNTED CARPET HANDLING EQUIPMENT

Our invention is particularly directed to the problems of loading large rolls of carpeting onto a truck and unloading carpeting from a truck where expensive forklift or similar heavy duty material handling equipment is unavailable or too expensive for use. Rolls of carpeting are commonly made in lengths up to 15 feet and weigh in excess of 800 pounds each. Manual loading and unloading of such large rolls is clearly undesirable.

Our invention provides apparatus which, when mounted on a conventional truck body, will provide a loading and unloading tool for ready handling of carpeting and will permit a single individual to load and unload a truck in a safe and efficient manner. By using manual means, as many as four individuals may be required to expend a great deal of time and exhausting effort to load and unload carpet rolls.

The present invention accomplishes all of these purposes through the use of a remote controlled motor-driven winch mounted near ceiling height on the wall at the front of the truck body and pulley apparatus mounted at various locations in the truck for changing the axis of application of force from the winch to provide the combination of lifting and pulling forces necessary to load and unload carpeting from the truck. The present invention provides all of the lifting and pulling forces necessary using a single cable attached at only one point to the carpet roll to be loaded or unloaded. A motor and cable shaft is provided at the front of the truck. A cable attached to the shaft is adapted to be engaged with a pulley mounted at the rear door of the truck for applying vertical forces to the end of a carpet roll which is to be loaded into the truck. The same pulley is used for unloading of the carpet when the free end of the cable is attached to the end of the carpet roll which is located at the front of the truck. The motor and cable winding shaft is operated directly, without the pulley to pull a partially loaded carpet fully into the body of the truck. Additional pulleys mounted on the floor of the truck at the front and the rear are utilized to load carpet rolls on pallets onto the truck and move them off of the truck respectively

BRIEF DESCRIPTION OF THE DRAWINGS

FIG. 1 is an isometric view of the carpet roll loading and unloading equipment shown being used for unloading a carpet roll and showing in a phantom view the arrangement of the equipment for performing the first step in loading a carpet roll.

FIG. 2 is a side view of the ceiling height mounted pulley assembly shown in the configuration for unloading the carpet from the truck.

FIG. 3 is a side view of the ceiling height mounted pulley assembly shown in the configuration for loading a carpet into the truck.

FIG. 4 is a simplified isometric view showing the second step in loading a carpet roll onto the truck FIG. 5 is a simplified isometric view showing the third step in loading a carpet onto the truck.

FIG. 6 illustrates the manner of connecting a rear floor mounted pulley for unloading a pallet or carpeting.

FIG. 7 illustrates a manner of connecting the cable to a pallet.

Turning first to FIGS. 1 to 3, there is illustrated a first embodiment of a truck mounted carpet loading and unloading device in accordance with our invention. This apparatus is shown attached to a conventional truck trailer 10. A motor 12 is connected to a gearbox 14 which provides the drive power to one end of a shaft 16, the other end of which is rotatably supported by a bearing assembly 18 which is mounted on a support frame 20. Support frame 20 is bolted to the front wall of the truck with a plurality of bolts which pass through the front wall of the trailer and through two channel members 22 which are advantageously formed of 2 × 3 × 48 inches material. Channel members 22 serve to reinforce the front wall of the truck trailer to provide an adequate mounting base for the winch assembly. The power leads for motor 12 are enclosed in a conduit 24 which is attached to the side wall of the truck trailer and terminated in a junction box 26.

Junction box 26 is also connected to a plug 28 which is used to receive electrical power for the motor from a source exterior to the truck. Also connected to junction box 26 is a portable control cord 30 which is terminated in a reversing switch 32.

When plug 28 is connected to receive electrical power, operation of reversing switch 32 permits an operator standing within the truck body to start and stop the rotation of motor 12 in a selected direction of rotation to wind or unwind a cable 34.

Cable 34 has one end wound around shaft 16 of the winch assembly and the other end passing through a pulley assembly 36 which is mounted over the rear door of truck trailer 10. In order to achieve a constant gear ratio, the portion of shaft 16 upon which the cable is to be wound is sufficiently long to permit winding the entire cable on shaft 16 without winding it on other layers of cable. FIG. 2 shows the detail of the connection of pulley assembly 36 to a channel member 38 which is attached to the rear of the trailer above the door. Channel member 38 has a plurality of slots 40 into which pulley assembly 36 may be mounted.

When the carpet loading and unloading apparatus is in the configuration shown in the solid lines of FIG. 1, cable 34 passes through pulley 36 and is attached to the end portion of carpet roll 42 which is located at the front of the truck. We have found that a carpet roll may be readily grasped by use of a lasso or running noose. This can be readily formed by placing a small hook or fixed loop at the end of cable 34 and passing the remainder of the cable through the hook or loop to form a noose.

The carpet loading and unloading apparatus can be operated in the configuration shown in FIG. 1 to unload the carpet roll from the truck by actuation of reversing switch 32 to drive motor 12 in a direction of rotation tending to cause gearbox 14 to rotate shaft 16 to wind cable 34 about shaft 16 to exert a force along carpet roll 42 tending to move it to the rear trailer 10 and gradually advance the end of the carpet roll to the ground. The end of carpet roll 42 can be loaded onto one or more conventional dollies as carpet roll 42 is gradually removed from the truck. As the roll is pulled out of the truck and loaded onto the dolly, it can be steered by exertion of minimal force on carpet roll 42 transverse to the direction of movement of the roll by the operator as he continues to operate the apparatus.

Carpet roll loading and unloading apparatus of the present invention can be used to load a carpet roll onto the truck by positioning the roll on one or more dollies at the rear of the truck. During loading the carpet rolls onto the truck, it is desirable to reposition pulley assembly 36 as shown in FIG. 3 so that the pulley projects slightly outward from the rear of the truck to permit the edge of the carpet roll, as it is lifted upward, to have adequate clearance from the rear of the truck.

After the end of the carpet roll has been lifted beyond the height of the floor of the truck by operation of the winch, the motor is turned off and the cable loosened from its connection with the end of the carpet roll so that it can be moved to a point between one-half and three-quarters of the length of the carpet roll. In order to move the end of the cable it is necessary to slacken cable 34 sufficiently to permit its movement by operation of the motor to unwind cable 34, or the motor 12 and the gearbox 14 can be disengaged from shaft 16 by disengaging shaft 16 from the drive pin of gearbox 14.

After cable 34 has been reconnected to the carpet roll at the point between one-half and three-quarters of its length, motor 12 is again operated until the carpet reaches the position shown in FIG. 4.

After the cable has lifted the carpet roll into this position, cable 34 is again slackened and removed from the carpet roll and from pulley 36. The cable is then wrapped around the end of the carpet as shown in FIG. 5 and motor 12 is operated to further wind cable 34 on shaft 16 to draw the carpet the remainder of the distance into the body of the truck.

Additional carpets may be loaded utilizing the same procedure. In order to locate additional carpet rolls in empty positions on the truck floor, a different slot 40 can be selected to line the carpet roll up with the empty space. Carpets can be loaded in a double-deck manner utilizing the same procedure. Use of a ramp 44 serves to simplify the loading of carpet rolls in the double-deck manner. A typical ramp 44 may be approximately 5 feet long and 30 inches wide.

Carpet which has been placed on pallets may be readily loaded onto the truck utilizing floor mounted pulley assemblies 46 and 48. Pulley 46 is located at the front of the truck and is attached to a ring 50 mounted in the floor of the truck. Pulley 48 is attached to the rear door latch 52 as shown in more detail in FIG. 6. Pulley 46 may also be located on the front wall of the truck near the floor.

A carpet loaded on a pallet is pulled up ramp 44 by attaching the loop on the end of cable 34 to the pallet after having passed cable 34 through front pulley assembly 46. As the winch is driven and shaft 16 located to wind cable 34 about it, the cable is retracted, thereby drawing the pallet up ramp 44 and forward in the truck. The unloading of the palletized carpet is accomplished by running cable 34 through rear pulley assembly 48 and connecting the free end of cable 34 to the pallet 60 as shown in FIG. 7. When the winch is driven to rotate shaft 16, the pallet is pulled to the rear of the truck and the edge of ramp 44. The pallet may, if necessary, then be eased down ramp 44 by connecting cable 34 through pulley 46 to shaft 16 and allowing the cable wrapped around shaft 16 to slowly unwind, permitting the pallet to slide down the ramp at a controlled rate of speed.

While all of the above description has been made with reference to cables, we have found that the most desirable cable is a ½ inch diameter nylon rope. A ½ inch nylon rope has a tensile strength of approximately 5,000 pounds. The nylon rope has proved to be most satisfactory for this purpose, as it is clean, requires no lubrication, and does not have a tendency to fray or interfere with handling of materials, as is the case with steel cable. Likewise, it is relatively inexpensive and does not tend to kink.

We claim:
1. In combination with a truck having a compartment suitable for transporting carpet rolls, a carpet roll loading and unloading device, comprising:

a shaft rotatably mounted on the upper portion of the front wall of the carpet carrying compartment of said truck, reversible motor means for rotating said shaft to wind said cable about said shaft when said motor means is driven;

motor control means for selectively driving said motor means;

pulley means attached above the rear opening to said carpet carrying compartment;

cable means passing over said pulley means, one end of said cable means connected to said shaft, the other end of said cable means terminated in a slip noose to provide means for encircling and engaging said carpet roll, the intermediate portion of said cable means in a first operation condition passing through said first pulley means to provide a substantially vertical lifting force when said motor means rotates said shaft to wind said cable on said shaft thereby to lift the end of a carpet roll engaged by said slip noose to a height above the floor of said carpet carrying compartment sufficient to permit insertion of the end of said carpet roll into said carpet carrying compartment, the central portion of said cable means in a second operating condition passing directly from said shaft without passing through said pulley means to provide a force on the carpet roll engaged by said slip noose which tends to slide said carpet roll toward the front of said carpeting carrying compartment.

2. Apparatus in the class described in claim 1 wherein said motor control means is operable to selectively disengage said shaft from said motor to permit free rotation of said shaft so that the slip noose at the other end of said cable means can be readily removed from said pulley means when said carpet roll loading and unloading device is changed from its first operating condition to its second operating condition after one end of said carpet roll has been placed on the floor of said carpet carrying compartment.

3. Apparatus of the class described in claim 1 wherein the carpet lifting operation performed when said device is in the first operating condition is accomplished in two steps, a first step wherein one end of said carpet roll is inserted at the rear opening of said carpet carrying compartment and the second step which is accomplished by moving said slip noose to a point between one-half and three-quarters of the total length of the carpet to place more than one-half of the total length of the carpet on the floor of said carpet carrying compartment prior to changing said device from said first to said second operating condition.

4. In combination with a truck having a compartment suitable for transporting carpet rolls loaded on pallets, a carpet roll pallet loading and unloading device, comprising:

a shaft rotatably mounted on the front wall of the carpet carrying compartment of said truck;

first pulley means mounted below said shaft and above the floor of said carpet carrying compartment, second pulley means mounted at the rear and above the floor of said carpet carrying compartment;

motor means for rotating said shaft;

motor control means for driving said motor in a first direction when actuated; and cable means, one end of said cable means connected to said shaft, the other end of said cable means being adapted to be connected to a carpet bearing pallet, the intermediate portion of said cable means in a first operating condition passing through said first pulley means to provide a force parallel to the floor of said carpet carrying compartment to urge a carpet bearing pallet toward the front of said carpet carrying compartment, the intermediate portion of said cable means in a second operating condition passing through said second pulley means and adapted to be connected to the other end of said carpet bearing pallet to provide a force substantially parallel to the floor of said carpet carrying compartment to urge said carpet carrying pallet in a direction away from the front of said carpet carrying compartment to cause said pallet to be removed from said carpet carrying compartment.

5. The method of loading a carpet roll onto the floor of a truck, comprising the steps of:

attaching the free end of a cable around the end of the carpet roll nearest the rear of said truck;

threading said cable through a pulley assembly located immediately above the rear door of the truck;

connecting said cable to a winch to pull said cable through said pulley assembly to raise the end of the carpet roll to the level of the floor of the truck;

momentarily releasing the free end of the cable from the end of the carpet and reattaching it to the point on the carpet roll more than half of the distance from the end of the carpet roll which was lifted to the floor of the truck to the other end of the carpet roll;

continuing to operate the winch to lift the carpet roll to a position where more than half of the carpet roll is positioned on the floor of the truck; and releasing the free end of the cable from a carpet roll, removing it from said first pulley and resuming the operation of said winch to exert a force substantially parallel to the floor of said truck to draw the remainder of said carpet roll into the body of said truck.

* * * * *